C. H. HARDEN.
LATCHING DEVICE FOR DOORS.
APPLICATION FILED APR. 23, 1917.
1,326,193.
Patented Dec. 30, 1919.
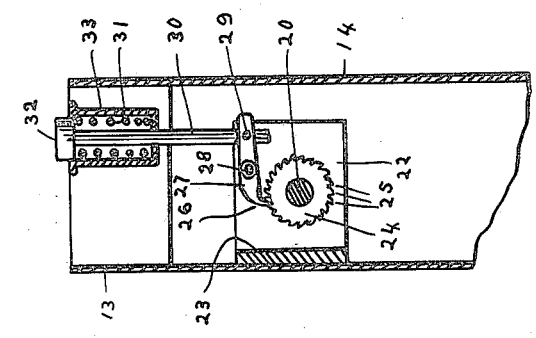
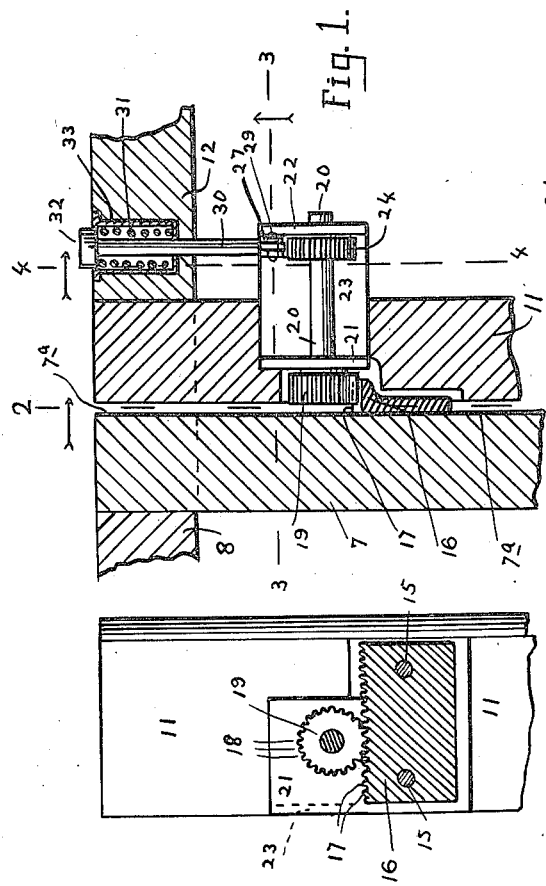
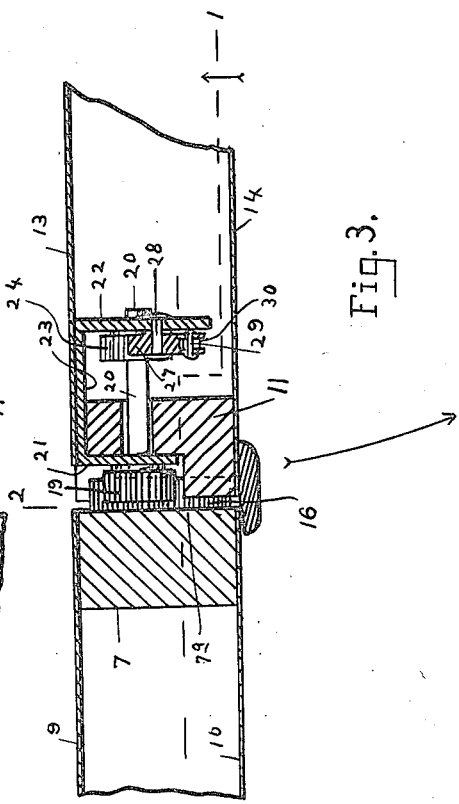
INVENTOR
Charles H. Harden
BY Martin & Jones
ATTORNEYS

UNITED STATES PATENT OFFICE.

CHARLES H. HARDEN, OF CAMDEN, NEW YORK.

LATCHING DEVICE FOR DOORS.

1,326,193. Specification of Letters Patent. Patented Dec. 30, 1919.

Application filed April 23, 1917. Serial No. 163,805.

*To all whom it may concern:*

Be it known that I, CHARLES H. HARDEN, of Camden, in the county of Oneida and State of New York, have invented certain new and useful Improvements in Latching Devices for Doors; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to a locking device for doors in general, but particularly for the doors of automobiles or similar places where it is especially desirable that the door shut easily and automatically lock itself and remain locked until purposely unlocked or released.

The purpose of my invention is to provide an improved locking device of the character described and one that is especially adapted to satisfactorily fulfil the requirements of such a device upon the doors of automobiles.

A further purpose is to provide a locking device with a plurality of locking positions so that the door will be locked when the parts of the device have been brought into engagement, although the door has not been entirely closed.

A further purpose is to provide a locking device of the character described that is especially well adapted to automatically lock when the door is shoved or slammed toward closed position with various degrees of force.

A still further purpose is to provide a locking device of the character described that is particularly well adapted to insure automatic locking even where the door and door frame are subjected to considerable dislocation of their proper relative position and even where they are subjected to the vibration and strain incident to an automobile in motion.

Another object of this invention is to provide an article of the class described provided with ready means for releasing the lock when desired.

Yet another purpose is to provide a locking device which is so constructed that it may be readily applied to the ordinary door of an automobile with a minimum of work and cutting of the automobile door or the frame therefor.

Further purposes and advantages of my invention will appear from the specification and claim herein.

It will be understood that while I have illustrated and will describe my invention as applied to an automobile door, the device is not limited to that application. I have shown it applied to an automobile door for the reason that it is particularly well adapted to serve the purpose in mind under the severe conditions of an automobile door.

Figure 1 is a vertical sectional view on line 1—1 of Fig. 2 through a part of an automobile door and its frame, showing mostly in front elevation a locking device embodying my invention.

Fig. 2 is a vertical sectional view on line 2—2 of Fig. 1.

Fig. 3 is a horizontal sectional view on line 3—3 of Fig. 1.

Fig. 4 is a vertical sectional view on line 4—4 of Fig. 1.

Referring to the drawings in a more particular description, the door frame of the automobile is represented by the upright post 7 connected to the upper frame member 8 and the inner and outer covering members 9 and 10 respectively of sheet metal or other suitable material adapted to form the ordinary frame of an automobile. Of the automobile door there is shown the upright 11 at the free edge of the door, held in place by the upper door stile 12, inner and outer surfacing members 13 and 14 and other frame members of the door in the usual way (not shown) and hinged to the opposite side of the door frame in the usual manner. Upon the edge or surface 7ª of the door frame 7 is secured as by rivets or screws 15 a rack 16 having projecting teeth 17 adapted to mesh with and be engaged by the teeth 18 of toothed wheel 19 oppositely located upon the free edge of the door. The toothed wheel 19 is fixed upon the projecting end of the shaft 20 which is journaled at two places, namely in the arms 21 and 22 of a channel-shaped support 23. Within the arms of this support and preferably closely adjacent to the arm 22 farthest from the free edge of the door there is affixed upon the shaft 20 a ratchet wheel 24 having teeth 25. These teeth are preferably slanted decidedly in one direction so that the point 26 of the pawl 27 may slide over the teeth one way but prevent reverse movement of the ratchet wheel. The pawl 27 is pivoted upon a pin 28 projecting inwardly from the adjacent arm 22 of the support 23. The pawl 27 is normally under yielding tension to bear against the ratchet wheel as by being pivotally connected as at 29 to a rod 30 extending upward through the upper door stile 12 and tensioned to be held in upper position by a coil spring 31 bearing against the lower side of a head or button 32 secured to the top of the connecting rod 30. Preferably a cup or thimble 33 will be set into the upper edge of the stile 12 to form a housing for the spring 31 about the upper end of the rod 30 and further to provide a guide for the button 32 which normally extends slightly down into the upper end of said thimble 33. It will now be seen that the parts just described normally hold the pawl 27 in engagement with the ratchet wheel 24 under spring tension which may be overcome and the pawl disengaged from the ratchet by downward pressure upon the button 32.

Assuming the arrangement of the door to be as shown in Fig. 3 so that the door will open by swinging in the direction indicated by the arrow and assuming the relative connection of parts as indicated upon the drawings, it will be obvious that the toothed wheel 19 and the ratchet wheel 24 will have a free movement in an anti-clockwise direction, but that movement in the reverse or clockwise direction will be normally prevented by the pawl 27 engaging the ratchet wheel 24. It will be further seen that depressing manually or otherwise the button 32 will disengage the pawl from the ratchet wheel and allow said ratchet wheel to freely revolve in clockwise direction and therefore allow the toothed wheel 19 to revolve freely in a similar direction and to a similar extent.

Assuming the door to be open the operation of the device would be as follows: As soon as the door comes near enough to closed position or part way into the door frame the revoluble toothed wheel 19 will come into engagement with the relatively stationary rack 16. A further movement of the door toward closed position will to a proportionate extent push toothed wheel 19 along the rack 16 and thereby rotate said wheel in anti-clockwise direction. Movement of the toothed wheel in this direction is allowed as heretofore mentioned by the spring-tensioned pawl 27 which will be forced upward by the slanting teeth 25 upon the ratchet wheel 24 camming said pawl upward against the power of spring 31. As each tooth 25 passes the point of the pawl 27 the pawl will be forced down between the teeth again under the tension of said spring and will thereby obviously prevent reverse movement of said ratchet wheel 24; that is will prevent movement of said ratchet wheel in a clockwise direction. It will therefore be seen that as soon as the toothed wheel 19 has come into engagement with the nearest teeth upon the rack 16 the door will be held locked in that position against swinging open. Further movement of the door to closed position will bring the door to successive locked positions until the door is finally fully closed in which position the door will be held locked in a similar manner.

To unlatch the door a person simply depresses the projecting button 32 at the top of the door thereby withdrawing the pawl 27 from the ratchet wheel 24 whereupon the door may be swung outward. During the first part of such outward movement the toothed wheel 19 is riding across the rack 16 and freely moving meanwhile in a clockwise direction. The button 32 simply needs to be held down during the first inch or two of outward swinging movement of the door.

It will now be seen that I have provided a latching device of great simplicity, strength and adaptability and one which is especially well suited to perform the work required, in holding an automobile door locked in various positions even against the vibration of a moving car or the strain and twisting of the car incident to use.

The channel-shaped support 23 provides proper support for the shaft 20 and toothed wheel 19 and ratchet wheel 24 and also provides a mounting for the pawl 27. This channel-shaped support is readily secured to the door upright 11 by screws or bolts extending from said support into said upright. Said upright 11 may be conveniently shaped or partly cut away for a short distance as plainly indicated in the drawings so as to have the toothed wheel 19 practically flush at its outer surface with the upright 11 as plainly indicated in Figs. 1 and 3. The upright 11 may be either provided with an aperture to receive the shaft 20 endwise therethrough or may be provided with a slot or recess to receive the shaft from the side.

What I claim as new and desire to secure by Letters Patent is:

In a latching device for doors the combination of a door frame, a rack upon the door frame, a door, a pinion upon the door adapted to be brought into engagement with the rack as the door is closed, a revoluble shaft fixed to and supporting said pinion and extending to a point within the body of the door, a separate ratchet wheel fixed upon the inner end of said shaft and within the body of the door, a yieldingly mounted pawl within the body of the door and normally engaging said ratchet wheel whereby said pawl yields and allows the toothed wheel to rotate as the door is brought toward closed position but prevents the door from opening and a push rod operatively connected to said pawl within the body of the door and having one end extend to a point without the door whereby the pawl may be withdrawn from the ratchet wheel allowing the door to be opened.

In witness whereof I have affixed my signature this 19th day of April, 1917.

CHARLES H. HARDEN.